United States Patent
Vella-Coleiro et al.

(10) Patent No.: US 10,677,934 B2
(45) Date of Patent: Jun. 9, 2020

(54) RAPID AZIMUTH DETERMINATION IN A GPS INTERFEROMETER

(71) Applicant: CommScope Technologies LLC, Hickory, NC (US)

(72) Inventors: George P. Vella-Coleiro, Summit, NJ (US); Andrea Moro, Desio (IT)

(73) Assignee: CommScope Technologies LLC, Hickory, NC (US)

( * ) Notice: Subject to any disclaimer, the term of this patent is extended or adjusted under 35 U.S.C. 154(b) by 300 days.

(21) Appl. No.: 15/606,414

(22) Filed: May 26, 2017

(65) Prior Publication Data

US 2017/0357010 A1 Dec. 14, 2017

Related U.S. Application Data

(60) Provisional application No. 62/347,788, filed on Jun. 9, 2016.

(51) Int. Cl.
*G01S 19/55* (2010.01)
*G01S 19/54* (2010.01)
*G01S 19/35* (2010.01)

(52) U.S. Cl.
CPC .............. *G01S 19/55* (2013.01); *G01S 19/35* (2013.01); *G01S 19/54* (2013.01)

(58) Field of Classification Search
None
See application file for complete search history.

(56) References Cited

U.S. PATENT DOCUMENTS

| 5,933,110 A | * | 8/1999 | Tang | G01S 19/55 342/357.37 |
| 2010/0312428 A1 | * | 12/2010 | Roberge | A01B 69/007 701/23 |
| 2016/0020504 A1 | | 1/2016 | Michaelis et al. | |

OTHER PUBLICATIONS

Dai et al. "Toolbox for GPS-based attitude determination: An implementation aspect" *Matlab-Modelling, Programming and Simulations* (pp. 389-404) (2010).
Kiam, Jane Jean "Low-cost GPS-based Compass with Reliable Ambiguity Resolution and Cycle Slip Correction" *Institute for Communications and Navigation* (96 pages)(Sep. 16, 2013).

* cited by examiner

*Primary Examiner* — Whitney Moore
(74) *Attorney, Agent, or Firm* — Myers Bigel, P.A.

(57) ABSTRACT

An apparatus includes a controller coupled to at least two antennas and one or more sensors. An initial azimuth value for the apparatus is determined based on output of the one or more sensors. Respective phase differences between satellite signals received from respective satellites at the at least two antennas are detected, and respective phase difference values for the respective satellites are calculated based on the initial azimuth value, a distance between the at least two antennas in the apparatus, and positions of the respective satellites. An actual azimuth angle of the apparatus is identified based on the initial azimuth value from the output of the one or more sensors and variations between the respective detected phase differences and the respective calculated phase difference values for the respective satellites.

22 Claims, 7 Drawing Sheets

FIG. 8A  FIG. 8B

RAPID AZIMUTH DETERMINATION IN A GPS INTERFEROMETER

CLAIM OF PRIORITY

This application claims priority from U.S. Provisional Patent Application No. 62/347,788, filed Jun. 9, 2016 in the United States Patent and Trademark Office, the disclosure of which is incorporated by reference herein in its entirety.

FIELD

The present disclosure relates to techniques for determining alignment and, more particularly, to techniques for determining antenna alignment.

BACKGROUND

Knowledge of the orientation of an object (for example, an aircraft or boat or wireless communications base station antenna) may be desired in many situations. For example, in order to provide radio signals throughout a defined area, antennas in cellular wireless communications systems may be oriented to face a specific direction (referred to as "azimuth") relative to true north, to be inclined at a specific downward angle (referred to as "tilt" or "pitch") with respect to the horizontal in the plane of the azimuth, and to be vertically aligned (referred to as "roll" or "skew") with respect to the horizontal in the plane of the azimuth. Undesired changes in azimuth, tilt, and/or roll can detrimentally affect the coverage of antennas. The more accurate the installation of the antennas, the better the network performance that may be achieved within the area served by the antennas.

An antenna's azimuth, tilt, and/or roll can change over time, due to for example the presence of high winds, corrosion, poor initial installation, vibration, hurricanes, tornadoes, earthquakes, or other factors. Wireless service providers may conduct periodic audits of their communication antennas to ensure that each antenna has not deviated significantly from its desired azimuth, tilt, and/or roll directions. Wireless service providers may hire third-party tower companies to perform audits and to make any necessary adjustments to maintain the desired alignment. Such audits, however, may be labor intensive and dangerous, often requiring certified tower climbers to physically inspect each antenna, and to take appropriate measurements to determine deviations from the desired positioning. This can become even more time consuming if many towers are affected as a result of a hurricane or storm, as the antennas may have to be checked one-by-one to determine which towers have been affected.

Some conventional techniques for determining antenna alignment may use magnetometers, accelerometers, gyroscopes, and/or GPS (global positioning system) receivers to determine the current alignment of an antenna and/or to detect changes in antenna alignment over time. However, such methods may lack sufficient accuracy for antenna alignment applications. For example, magnetometers may be subject to local distortions in the earth's magnetic field, and may not sufficiently address the antenna's geolocation (i.e., latitude, longitude, and altitude).

SUMMARY

According to some embodiments of the present disclosure, an apparatus includes at least two antennas, and a controller coupled to the at least two antennas. The controller is configured to perform operations including determining a range of azimuth values for the apparatus; detecting, for respective satellites, respective detected phase differences between satellite signals received therefrom at the at least two antennas; calculating, for the respective satellites, respective calculated phase difference values based on a distance between the at least two antennas in the apparatus and positions of the respective satellites; and identifying an actual azimuth angle of the apparatus based on variations between the respective detected phase differences and the respective calculated phase difference values for the respective satellites over the range of azimuth values.

In some embodiments, identifying the actual azimuth angle may include comparing, for the respective satellites, the respective detected phase differences with the respective calculated phase difference values to determine the variations therebetween; and identifying, within the range of azimuth values, the actual azimuth angle of the apparatus as corresponding to one of the variations between the respective detected phase differences and the respective calculated phase difference values for the respective satellites.

In some embodiments, the one of the variations may be a lowest variation between the respective detected phase differences and the respective calculated phase difference values for the respective satellites.

In some embodiments, the respective detected phase differences may include respective ambiguities. Identifying the actual azimuth angle of the apparatus may include assigning respective values to the respective ambiguities based on the range of azimuth values to reduce the variations between the respective detected phase differences and the respective calculated phase difference values for the respective satellites; and computing the actual azimuth angle of the apparatus based on the respective detected phase differences for the respective satellites, responsive to assigning the respective values to the integer ambiguities thereof.

In some embodiments, one or more sensors may be coupled to the controller. Determining the range of azimuth values may include determining an initial azimuth value for the apparatus based on output of the one or more sensors; and determining the range of azimuth values about the initial azimuth value according to an accuracy of the one or more sensors.

In some embodiments, the one or more sensors may be one or more magnetometers, and one or more accelerometers may be coupled to the controller. Calculating the respective calculated phase difference values may be further based on the initial azimuth value from the output of the one or more magnetometers and a pitch angle of the apparatus indicated by output from the one or more accelerometers.

In some embodiments, the one or more sensors may be first and second magnetometers in an antipode arrangement within the apparatus.

In some embodiments, detecting the respective detected phase differences may be performed based on receiving the satellite signals from the respective satellites for a duration of about 10 seconds or less.

In some embodiments, the positions of the respective satellites may be coordinates calculated from the satellite signals received therefrom. The controller may be further configured to perform operations including identifying the respective satellites responsive to analysis of the satellite signals received therefrom, where the identifying may include determining a code phase and carrier frequency for the respective satellites; tracking the code phase and carrier frequency for the respective satellites using phase-locked loops; identifying respective preambles in the satellite signals responsive to the tracking, where the respective preambles indicate a beginning of each of multiple sub-frames in the satellite signals; obtaining respective ephemeris parameters and time-of-week data for the respective satellites from ones of the multiple sub-frames in the satellite signals thereof; and calculating the coordinates of the respective satellites based on the respective ephemeris parameters and time-of-week data therefor.

In some embodiments, the controller may be further configured to perform operations including adjusting an aiming direction or tilt of the apparatus to a desired azimuth angle or a desired pitch, respectively, responsive to identifying the actual azimuth angle.

In some embodiments, the apparatus may include an alignment module of a base station antenna array, and where adjusting the aiming direction or tilt may include adjusting power levels and/or phase of a signal provided to one or more radiating elements of the base station antenna array.

In some embodiments, the apparatus may further include a communication interface coupled to the controller. The controller may be further configured to perform operations including monitoring changes in the aiming direction of the base station antenna array responsive to identifying the actual azimuth angle; and transmitting, via the communication interface, alignment and position of the base station antenna array to a base station operator.

In some embodiments, the controller may be further configured to perform operations including comparing the actual azimuth angle to a threshold value responsive to identifying the actual azimuth angle; and transmitting an alarm signal responsive to the actual azimuth angle exceeding the threshold value.

According to some embodiments of the present disclosure, a method for determining orientation of an apparatus includes performing operations by at least one processor. The operations include determining a range of azimuth values for the apparatus; detecting, for respective satellites, respective detected phase differences between satellite signals received therefrom at two or more antennas in the apparatus; calculating, for the respective satellites, respective calculated phase difference values based on a distance between the two or more antennas in the apparatus and positions of the respective satellites; and identifying an actual azimuth angle of the apparatus based on variations between the respective detected phase differences and the respective calculated phase difference values for the respective satellites over the range of azimuth values.

In some embodiments, identifying the actual azimuth angle may include comparing, for the respective satellites, the respective detected phase differences with the respective calculated phase difference values to determine the variations therebetween; and identifying, within the range of azimuth values, the actual azimuth angle of the apparatus as corresponding to one of the variations between the respective detected phase differences and the respective calculated phase difference values for the respective satellites.

In some embodiments, the one of the variations may be a lowest variation between the respective detected phase differences and the respective calculated phase difference values for the respective satellites.

In some embodiments, the respective detected phase differences may include respective ambiguities. Identifying the actual azimuth angle of the apparatus may include assigning respective values to the respective ambiguities based on the range of azimuth values to reduce the variations between the respective detected phase differences and the respective calculated phase difference values for the respective satellites; and computing the actual azimuth angle of the apparatus based on the respective detected phase differences for the respective satellites, responsive to assigning the respective values to the integer ambiguities thereof.

In some embodiments, determining the range of azimuth values may include determining an initial azimuth value for the apparatus based on output of one or more sensors; and determining the range of azimuth values about the initial azimuth value according to an accuracy of the one or more sensors.

In some embodiments, the one or more sensors may be one or more magnetometers, and calculating the respective calculated phase difference values may be further based on the initial azimuth value from the output of the one or more magnetometers and a pitch angle of the apparatus indicated by output from one or more accelerometers.

In some embodiments, detecting the respective detected phase differences may be performed based on receiving the satellite signals from the respective satellites for a duration of about 10 seconds or less.

In some embodiments, the positions of the respective satellites may be coordinates calculated from the satellite signals received therefrom. The operations may further include identifying the respective satellites responsive to analysis of the satellite signals received therefrom, where the identifying includes determining a code phase and carrier frequency for the respective satellites; tracking the code phase and carrier frequency for the respective satellites using phase-locked loops; identifying respective preambles in the satellite signals responsive to the tracking, wherein the respective preambles indicate a beginning of each of multiple sub-frames in the satellite signals; obtaining respective ephemeris parameters and time-of-week data for the respective satellites from ones of the multiple sub-frames in the satellite signals thereof; and calculating the coordinates of the respective satellites based on the respective ephemeris parameters and time-of-week data therefor.

Further features, advantages and details of the present disclosure, including any and all combinations of the above embodiments, will be appreciated by those of ordinary skill in the art from a reading of the figures and the detailed description of the embodiments that follow, such description being merely illustrative of the present disclosure.

BRIEF DESCRIPTION OF THE DRAWINGS

Embodiments of the present disclosure will become more fully apparent from the following detailed description, claims, and accompanying drawings in which like reference numerals identify similar or identical elements.

FIGS. 8A-8C illustrate the relative locations and orientations of accelerometers and magnetometers for three different example alignment modules in accordance with some embodiments described herein.

DETAILED DESCRIPTION OF EMBODIMENTS

Figure 2:
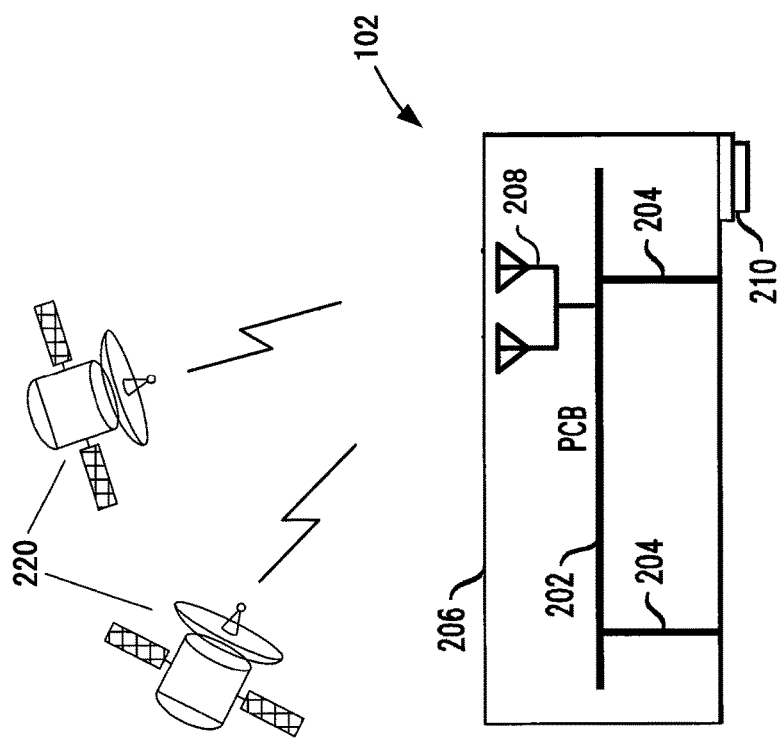
FIG. 2 illustrates a simplified, cross-sectional, side view of the alignment module of FIG. 1, in accordance with some embodiments described herein.

Some embodiments of the present disclosure arise from realization that an accurate measurement of an object's orientation, for instance, the azimuth component, can be difficult to obtain. A magnetic compass (or its electronic equivalent, a magnetometer) can be used to determine the magnetic azimuth, but its accuracy may be limited by several factors, including the declination with respect to the true azimuth (also referred to as true North), and the presence of stray magnetic fields caused by magnetic materials and/or current-carrying conductors in the vicinity of the magnetometer (which can distort the Earth's magnetic field, causing an error in the magnetic azimuth). For example, the magnetic azimuth indicated by some conventional electronic compass implementations may ultimately point towards the magnetic North, and the declination angle between magnetic North and true North should be added to the indicated magnetic azimuth to allow the electronic compass to point towards true North.

In light of these issues, navigation satellites (such as those in the GPS constellation and/or other navigation satellites such as Galileo) can be used to determine the azimuth. To use satellite signals to determine azimuth may require the use of two or more antennas separated by some distance. For example, signals received from the constellation of GPS satellites can be used to determine the azimuth of a base station antenna array with an accuracy of about 1 degree or less. While GPS antennas are typically non-directional within a hemisphere to receive a signal from wherever a satellite is located in the sky, directionality can be determined using two or more spaced apart antennas. The distance between the antennas may be limited to about 0.2 meters or less, to fit inside the radome of a typical base station antenna array.

In one method, referred to as a GPS interferometer, the difference in the phase of the carrier of a signal received at the two antennas from a GPS satellite is used to calculate the angle of arrival (AOA) of the signal. In particular, due to the difference in path length from the satellite to each antenna, the phase of the received signal is different for each antenna, and this detected phase difference can be used to calculate the azimuth, based on known or determined positions of the satellites. The position of a satellite can be determined from the orbital information (ephemeris) transmitted by the satellite, or from the GPS almanac, which may also be transmitted by the satellite or may be otherwise available. The approximate positions of the antennas can also be determined using conventional processing of the received GPS signals. The position of the satellite and the position of the antennas allow the bearing to the satellite to be calculated, and combining this bearing with the AOA yields the azimuth, with an accuracy of about one degree with the two antennas spaced apart by about 0.2 meters. The robustness of the techniques is enhanced by utilizing multiple satellites since, most of the time, signals can be simultaneously received from several satellites.

However, since the detected or measured phase of the received satellite signal cannot exceed 1 cycle or 360 degrees (as the phase difference is repeated for differences greater than 360 degrees), an integer ambiguity may exist, which should be resolved before the phase difference can be used to accurately calculate the azimuth. Some conventional methods for ambiguity resolution may perform an iterative least squares procedure; however, in instances where multipath distortion is present, such conventional methods may require acquisition of phase difference data over a period of two minutes or longer for accurate resolution. In some applications (such as adjusting the aiming direction of a wireless base station antenna to a desired azimuth), such a delay in the azimuth determination may be unacceptable.

Accordingly, some embodiments of the present disclosure provide apparatus and methods for more rapid and accurate azimuth and/or other orientation determination, by using local sensor-based information in combination with detected phase difference data from received wireless signals. For example, some embodiments may allow for resolution of the above integer ambiguities (or may otherwise provide accurate azimuth determination) within 10 seconds or less, or even within 5 seconds or less, by combining an approximate azimuth value, obtained from a device or sensor separate from the GPS interferometer, with the phase difference data derived from received satellite signals. The separate device or sensor can be a magnetometer whose output provides azimuth readings, also referred to herein as the magnetometer azimuth or initial azimuth value(s). The initial azimuth values may be corrected for declination and/or stray magnetic field effects in some embodiments.

Some embodiments of the present disclosure provide apparatus and methods for resolving inaccuracies in the magnetometer azimuth by comparing, for respective navigation satellites, detected phase differences (based on measurement or detection of satellite signals acquired from the navigation satellites at two or more antennas of the apparatus) with expected phase differences (based on calculation or estimation using the distance between the antennas, the coordinates of the respective navigation satellites, and/or other information) to determine variations therebetween. At least one of the variations between detected vs. expected phase difference for the respective navigation satellites (for example, a lowest variation) is used to identify the actual azimuth angle of the apparatus within or among a range of possible azimuth values. The range of possible azimuth values may be a predetermined range (e.g., 360 degrees) or may be determined based on the initial azimuth value(s) indicated by one or more magnetometers (or other sensors) according to an accuracy thereof (as affected by and/or compensated for, for instance, declination and/or stray magnetization).

For example, in some embodiments, the variation/difference between the measured/detected and calculated/expected phase difference for each satellite is squared, and the squared values are added together. This sum-of-squares procedure is performed for each possible azimuth value over a range centered around the magnetometer azimuth. The range may be, for example, about ±15 degrees with respect to the magnetometer azimuth, and the step size between possible azimuth values in the range may be about 0.5 degrees. In other embodiments, the range may be 360 degrees, in which case a magnetometer azimuth is not required; that is, the sum-of-squares procedure may be performed for each possible azimuth value over the full 360 degrees, with a predetermined step size. The "correct" or actual azimuth angle may be identified among the possible azimuth values in the range as the azimuth value having the smallest value or lowest variation of the sum of squares of the phase differences, i.e., the "best fit" between the measured and calculated phase differences for the respective satellites.

Further embodiments of the present disclosure may provide apparatus and methods for resolving the integer ambiguities discussed above, including but not limited to the following operations:

Acquired satellite signals are analyzed to detect which of the satellites in the GPS constellation are being received, phase differences therebetween, and to determine the code phase and carrier frequency of each satellite.

Information determined from the acquisition operations is used to track the code phase and carrier frequency of the satellites using phase-locked loops.

The data bits obtained from the tracking operations are used to find the preambles therein, which mark the beginning of each of multiple (e.g., five) sub-frames of the satellite data.

The data in particular sub-frames (e.g., sub-frames 1, 2, and 3) are used to obtain the parameters of the ephemeris of each satellite and the time-of-week (TOW).

The ephemeris and the TOW are used to calculate the co-ordinates of each satellite.

The magnetometer azimuth/initial azimuth value, along with the distance between pairs of antennas and the pitch angle (as determined for example from accelerometer data), are used together with the co-ordinates of the satellites to calculate the carrier phase difference between the satellite signals received at each pair of antennas.

The calculated carrier phase differences are compared with the measured/detected carrier phase differences for the respective satellites, and values are assigned to the integer ambiguities so as to reduce or minimize the difference between the calculated and the detected carrier phase differences.

Having resolved the integer ambiguities in the detected phase differences, the actual azimuth angle of the apparatus is computed based on the respective detected phase differences for the respective satellites.

Satellite data spanning a few seconds (typically about 10 seconds or less, or even 5 seconds or less) may be used to avoid the possibility of a few inaccurate measurements yielding incorrect integer ambiguities.

Embodiments of the present disclosure may be implemented in radio base station antenna arrays, among other applications. The Antenna Interface Standards Group (AISG) has released extension specifications Standard Nos. AISG-ES-ASD v2.1.0 and AISG-ES-GLS v2.1.0 defining required functionality of alignment sensor devices and geographic location sensors, respectively, which can require devices to determine and report the current alignment and position of an antenna over the existing interface defined by Standard No. AISG v2.0. The disclosures of these standards are incorporated by reference herein in their entireties.

Such standards for continuously monitoring the current alignment and position of base station antenna arrays can be integrated into the existing infrastructure. For example, the AISG alignment extension specification allows the operators of antennas to set desired angles for things like azimuth pointing angle and mechanical tilts, and to set allowable "thresholds" for each. As such, some embodiments of the present disclosure can subsequently trigger alarms if the determined orientation changes from the desired angles such that the thresholds are exceeded.

In some embodiments, the orientation of the base station antenna arrays can also be adjusted mechanically and/or electronically, responsive to identifying the actual azimuth angle or other orientation. For example, in some embodiments the effective angle of the beam or radiation pattern can be adjusted without altering the physical orientation of the housing or radome of the antenna. Methods for electronically altering azimuth, tilt, and/or roll may include adjusting the power levels and/or phase of the signal to radiating elements internal to the antenna. This can be done using circuitry internal to the base station antenna arrays which typically includes a controller, and can be controlled remotely via the AISG interface or other control interface. More generally, as described herein, various orientations of an antenna array, such as tilt angle, azimuth angle, etc., may be altered by physically adjusting the antenna array housing using one or more mechanical elements, and/or by electronically adjusting the magnitude and/or phase of the signal components that are fed to each of the radiating elements of the antenna array to exhibit a desired antenna coverage pattern in terms of, for example, beam elevation or tilt angle, beam azimuth angle, etc., responsive to determining the actual azimuth angle or other orientation of the antenna array.

Figure 1:
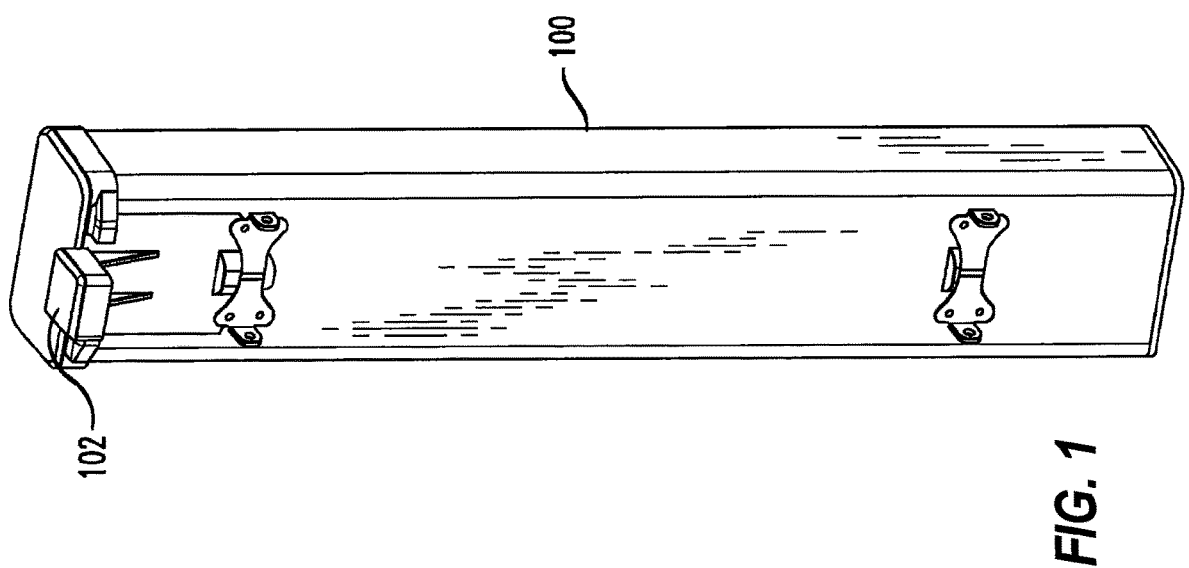
FIG. 1 illustrates a three-dimensional perspective view of a base station antenna configured with an exemplary alignment module designed for determining the alignment of the antenna, in accordance with some embodiments described herein.

FIG. 1 is a three-dimensional perspective view of a base station antenna array housing 100 (also referred to herein as a radome) including an example alignment module 102 that is operable to determine the alignment (including azimuth angle, tilt angle, and/or roll angle) of the antenna housing 100. In the embodiment of FIG. 1, the alignment module 102 is illustrated as being rigidly mounted to an external surface of the antenna housing 100; however, it will be understood that the alignment module 102 may be integrated internally or otherwise included within the housing 100 in some embodiments, for example, at the top or bottom of the housing 100 or behind the antenna reflector. When externally attached as shown in FIG. 1, the alignment module 102 may be mounted to the housing 100 in the factory (e.g., during assembly of the base station antenna array) or in the field (e.g., during or after mounting the antenna 100 to a base station tower). The alignment module 102 may be positioned to have the same orientation (azimuth, tilt, and roll) as the antenna housing 100. Since alignment module 102 is rigidly mounted to the housing 100 in FIG. 1, physical movement (e.g., rotation or translation) of antenna housing 100 will result in an equivalent movement of the alignment module 102. As such, an orientation determined using the alignment module 102 in accordance with embodiments as described herein also represents the orientation of the antenna housing 100.

FIG. 2 is a cross-sectional, side view of the alignment module 102 of FIG. 1. As shown in FIG. 2, alignment module 102 includes a printed circuit board (PCB) 202 mounted via stand-off structures 204 within an enclosure 206 having at least two global positioning system (GPS) antennas 208, and one or more AISG (an industry standards group) connectors 210, which are electrically connected to elements of the PCB 202. The enclosure 206 may be mounted in or on the antenna housing 100 of FIG. 1.

Figure 3:
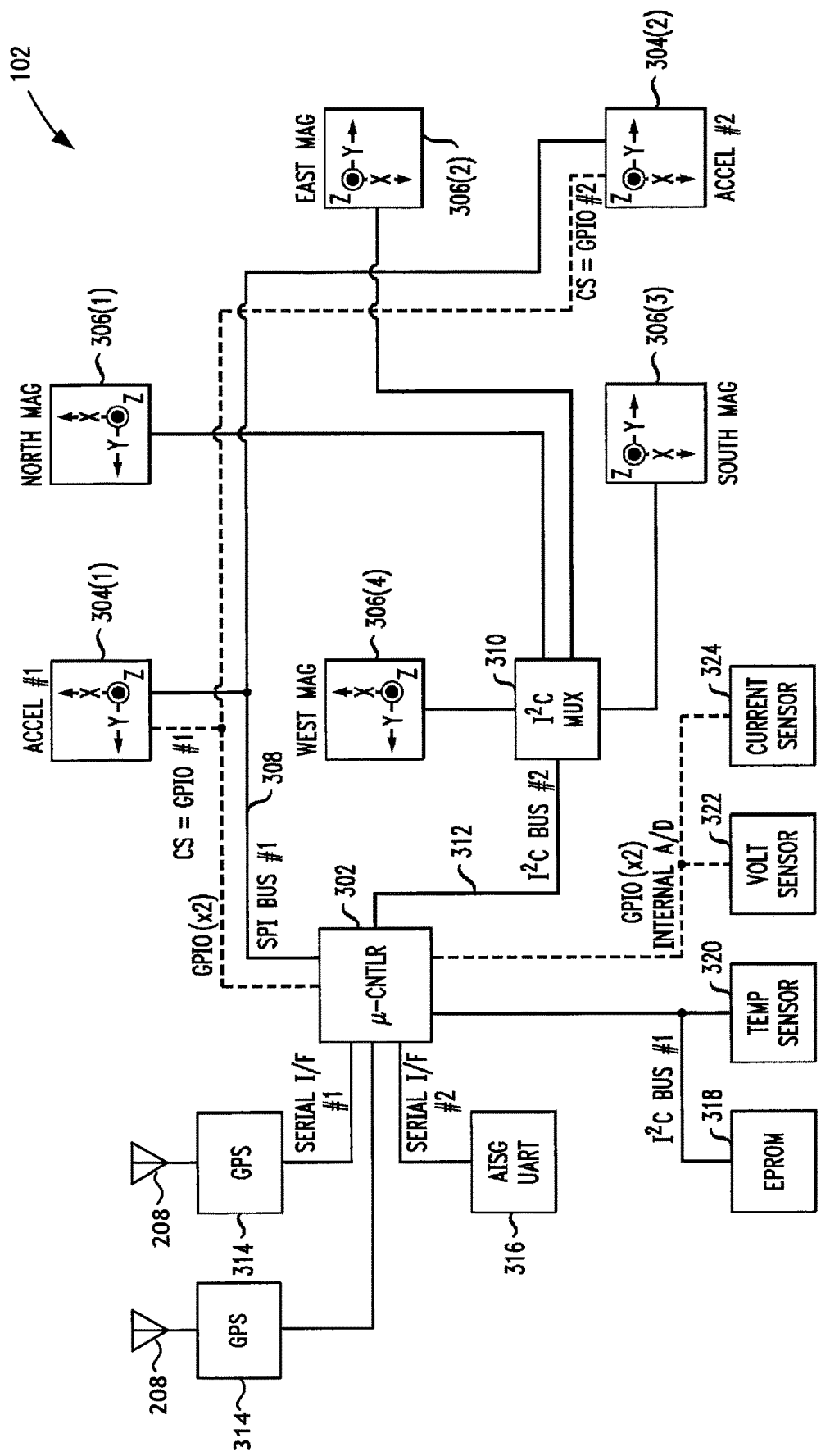
FIG. 3 illustrates an example schematic block diagram of the printed circuit board (PCB) of FIG. 2, in accordance with some embodiments described herein.

FIG. 3 is a schematic block diagram of the alignment module 102 of FIG. 1. As shown in FIG. 3, the alignment module 102 includes a controller 302, such as a microprocessor, which controls the operations of alignment module 102. The controller 302 is coupled to and receives signals generated by sensors (illustrated as two accelerometers 304(1)-304(2) and four magnetometers 306(1)-306(4)) and two satellite receivers (illustrated as GPS receivers 314, which are connected to the GPS antennas 208 of FIG. 2, respectively), and processes those signals to determine the present or current orientation of the antenna housing 100 on which the alignment module 102 is rigidly mounted. Depending on the particular implementation, controller 302 communicates some or all of the results of its signal processing to an external device via a network communications interface (illustrated as AISG UART (universal asynchronous receiver/transmitter) 316, which is connected to the AISG connectors 210 of FIG. 2) coupled to the controller 302.

In the embodiment of FIG. 3, sensor signals generated by the accelerometers 304 are provided to controller 302 via SPI (serial peripheral interface) bus 308, while sensor signals from the magnetometers 306 are combined by a multiplexer (MUX) 310 and provided to the controller 302 via I$^2$C (inter integrated circuit) bus 312. As described in further detail below, embodiments of the present disclosure may include other configurations having other numbers of accelerometers and/or other numbers of magnetometers.

The controller 302 is further coupled to a memory (illustrated as electronically programmable read-only memory (EEPROM)) 318, temperature sensor 320, voltage sensor 322, and/or current sensor 324 in particular embodiments, one or more of which communicate with controller 302 via various corresponding buses or other data interfaces. For example, in some embodiments, operations of the accelerometers 304 and/or magnetometers 306 may depend on temperature, voltage, and/or current. In such embodiments, signals from temperature sensor 320, voltage sensor 322, and/or current sensor 324 may be used by controller 302 to compensate for those dependencies. The memory 318 includes computer readable program code stored therein, which, when executed by the controller 302, causes the controller to carry out operations in accordance with embodiments of the present disclosure as described herein. As such, it will be understood that operations described herein as being performed by the alignment module 102 may refer to operations, stored as computer program instructions in the memory 318, which are at least in part executed by the controller 302.

Figure 4:
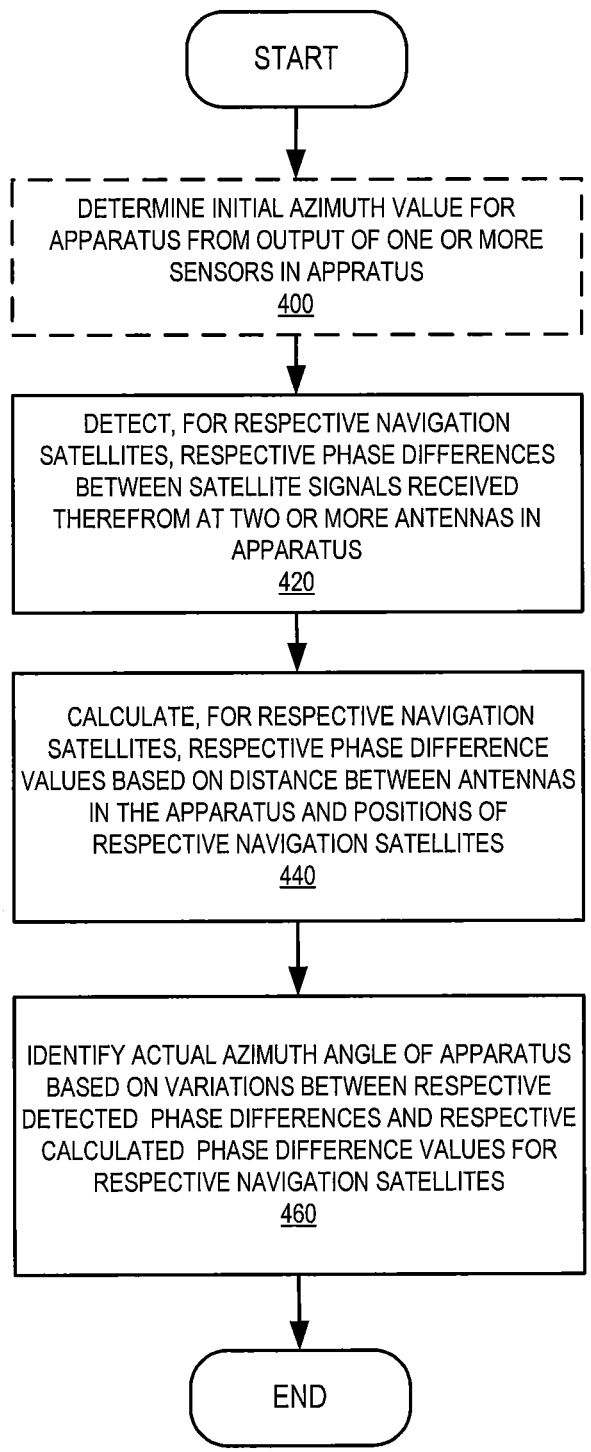
FIGS. 4-6 are flowcharts illustrating operations for determining orientation of an apparatus, such as a base station antenna, in accordance with some embodiments described herein.
Figure 5:
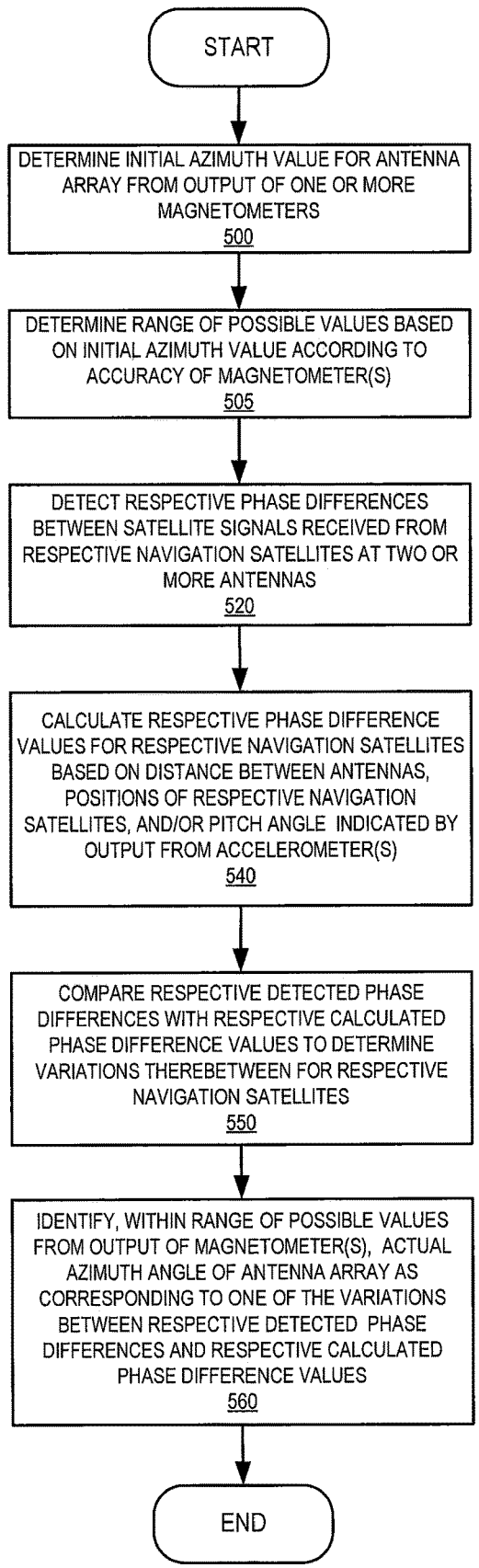
Figure 6:
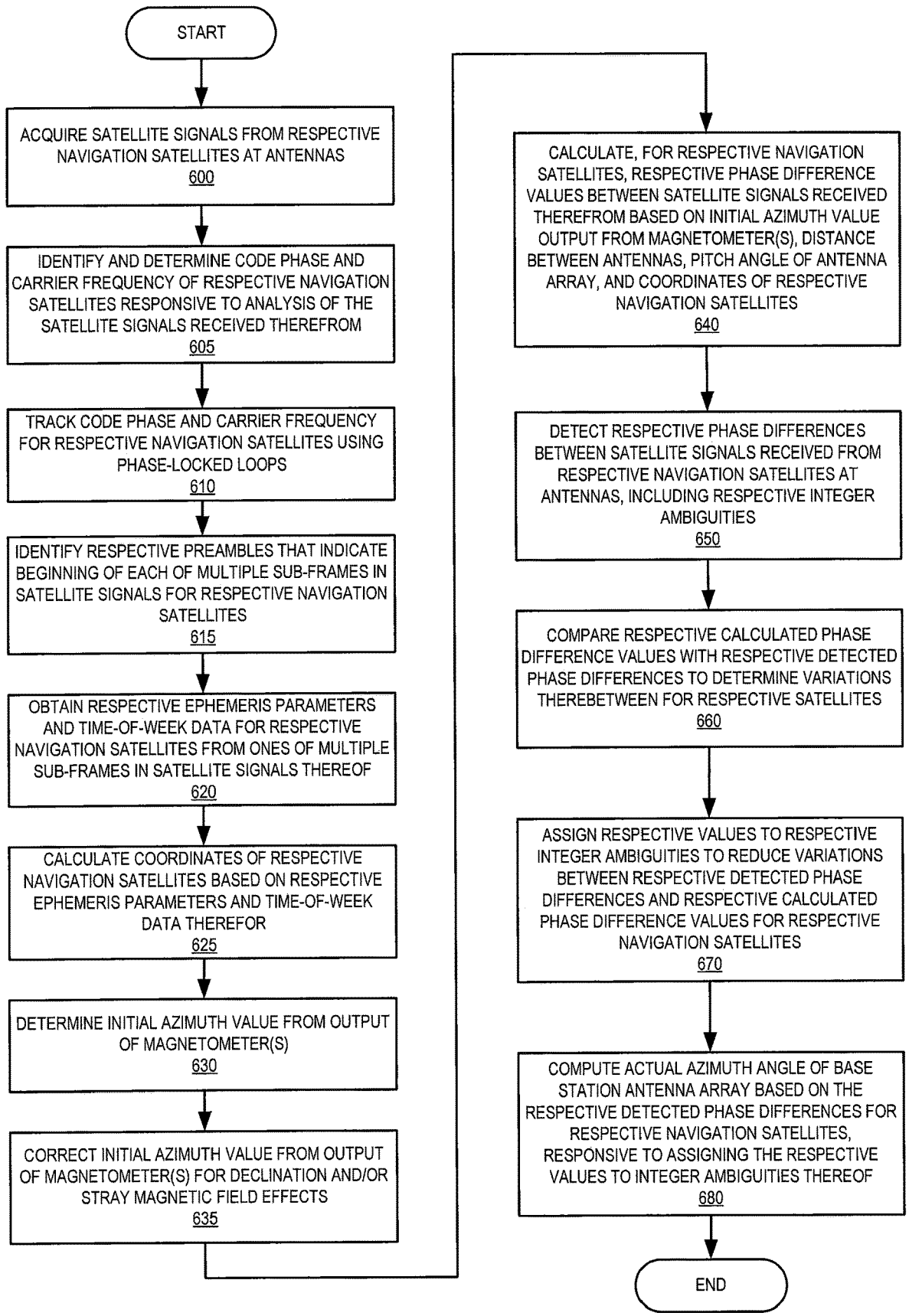

FIGS. 4-6 are flowcharts illustrating operations for determining orientation of an apparatus, such as a base station antenna, in accordance with some embodiments described herein. The operations of FIGS. 4-6 may be performed by the alignment module 102 of FIGS. 1-3 and/or the controller 302 of FIG. 3 in some embodiments.

Referring now to FIG. 4, an initial azimuth value (or other initial orientation indicator) for an apparatus is determined based on output of one or more magnetometers (or other sensor) in the apparatus at block 400. In some embodiments, the apparatus may be an alignment module (such as the alignment module 102 of FIGS. 1-3) included in or mounted to a base station antenna array. As noted above, the accuracy of the initial azimuth value may be affected by the declination angle between magnetic North and true North, and/or by stray magnetization effects. Alternatively, a range of possible azimuth values may be determined, where the range may be based on the initial azimuth value, or may be a predetermined range (in which case the determination of the initial azimuth value at block 400 may be optional or omitted).

At block 420, phase differences between satellite signals received from respective navigation satellites at two or more spaced apart antennas of the apparatus are detected. When included in an alignment module of a base station antenna array, the two or more spaced apart antennas of the apparatus may be distinct from the antennas of the base station antenna array, but may nevertheless be included in or on the same housing or radome in some embodiments. The detected phase difference for the signals received from one or more of the navigation satellites may involve an integer ambiguity, as the detected phase difference cannot exceed one cycle. Expected phase difference values are also calculated for the respective navigation satellites at block 440. The expected phase difference values may be calculated based on the distance between pairs of the antennas in the apparatus, a trial azimuth value (e.g., the initial azimuth value), and positions of the respective navigation satellites. The positions of the respective navigation satellites may be stored in a memory or database that is accessible to the apparatus, or may be computed from information obtained from the acquired satellite signals.

Still referring to FIG. 4, the calculated phase difference value for a respective navigation satellite may be compared with the corresponding detected phase difference for the satellite signals received from that same navigation satellite to determine a variation between the detected phase difference and the expected/calculated phase difference for each of the navigation satellites. An actual azimuth angle (or other actual orientation indicator) of the apparatus is thus identified based on the variations between the detected and expected phase differences for the respective navigation satellites at block 460. In some embodiments, the actual azimuth angle may be identified within a range of possible azimuth values (where the range may be centered around or otherwise based on the initial magnetometer output) as corresponding to a lowest one of the phase difference variations (as described with reference to FIG. 5), while in further embodiments, the actual azimuth angle may be computed responsive to resolving integer ambiguities in the detected phase differences (as described with reference to FIG. 6).

FIG. 5 is a flowchart illustrating more detailed operations for determining orientation of an antenna array, such as a base station antenna array, in accordance with some embodiments described herein. Referring now to FIG. 5, an initial azimuth value for the antenna array is determined based on output of one or more magnetometers included in an alignment module (such as the alignment module 102 of FIGS. 1-3) at block 500. The accuracy of the initial azimuth value may be affected, for example, by the declination angle between magnetic North and true North (depending on the geographic location of the antenna array), and/or by stray magnetization that may be present in the area of the antenna array. As such, a range of possible azimuth values is determined based on the initial azimuth value according to the accuracy of the magnetometers at block 505. Alternatively, the full 360 degrees may be used as the range of possible azimuth values, and the determination of the initial azimuth value at block 500 may be optional or omitted.

At block 520, respective phase differences between satellite signals received from respective navigation satellites at two or more antennas of the alignment module are detected, while at block 540, respective phase difference values for the respective navigation satellites are calculated. The calculated (i.e., expected) phase difference value for a respective navigation satellite may be computed based on a distance between a pair of antennas in the alignment module, a position of the respective navigation satellites, and/or a pitch angle of the alignment module. It will be understood that the pitch angle of the alignment module may differ from the pitch angle of the antenna array, depending on the orientation of the alignment module with respect to the antenna array housing. For example, the pitch angle of the alignment module may correspond to the roll angle of the antenna array (or vice versa) when the alignment module is mounted such that a line between the two satellite antennas is perpendicular to the aiming direction of the antenna array. The position of the respective navigation satellite may be stored in a memory or database that is accessible to the alignment module, or may be computed from information obtained from the satellite signals received from the navigation satellite. The pitch angle may be determined from or otherwise indicated by output of one or more accelerometers that are included in the alignment module.

For a respective navigation satellite, the calculated phase difference value is compared with the detected phase difference to determine a variation therebetween at block 550. As such, respective variations between detected and expected phase differences may be determined for each of the navigation satellites from which signals are received at the two or more antennas of the alignment module. At block 560, an actual azimuth angle of the antenna array (to which the alignment module is mounted) is identified (within the range of possible azimuth values that was determined based on the initial azimuth value output from the one or more magnetometers) as corresponding to one of the variations between the detected and expected phase differences. For example, the variation between the detected and calculated phase difference for each navigation satellite may be squared, and the squared values may be added together. This sum-of-squares procedure may be performed for each possible azimuth value over a range centered around or otherwise based on the initial azimuth value, or over a 360 degree range (in embodiments where the initial azimuth value is not determined at block 500). The actual azimuth angle may be identified as one of the possible azimuth values that corresponds to a lowest variation between the detected and calculated phase differences for the respective satellites, as indicated by the sum of squares.

In particular embodiments, one of the navigation satellites is selected as a reference satellite based on a criterion such as highest elevation, or least difference between the measured and calculated phase difference, or largest mean value of the carrier-to-noise ratio. Carrier phase double differences are then calculated by subtracting the carrier phase difference of the reference satellite from the carrier phase difference of each of the other satellites so as to cancel the unknown phase difference between the local oscillators of the two GPS receivers.

FIG. 6 is a flowchart illustrating operations for determining orientation of an antenna array, such as a base station antenna array, in accordance with further embodiments described herein. Referring now to FIG. 6, satellite signals from respective navigation satellites are acquired or otherwise received at multiple antennas of an alignment module (such as the alignment module 102 of FIGS. 1-3) at block 600. Responsive to analysis of the received satellite signals, the respective navigation satellites are identified, and a code phase and carrier frequency of each navigation satellites is determined therefrom at block 605. The code phase and carrier frequency for a respective navigation satellite are tracked using phase locked loops at block 610, and, based on data bits obtained from the tracking loops, respective preambles (indicating the beginning of each of multiple sub frames) in the satellite signals are identified at block 615.

At block 620, ephemeris and time of week (TOW) data are obtained for a respective navigation satellite from particular sub-frames in the satellite signals received therefrom. For example, for GPS satellites, the data in sub-frames 1, 2, and 3 of the satellite signals may indicate the ephemeris of a respective GPS satellite and the time of week. Coordinates of the respective navigation satellite are calculated based on the corresponding ephemeris parameters and time of week data at block 625.

An initial azimuth value is determined from the output of one or more magnetometers of the alignment module at block 630. The alignment module including the magnetometer(s) therein may be provided in or on the radome of the antenna array. The initial azimuth value determined from the output of the magnetometers is at least partially corrected for declination and/or stray magnetic field effects at block 635. For example, the magnetometer(s) may be initially calibrated based on present magnetic fields and/or offset to account for true North based on the geographic location of the antenna array, prior to obtaining the initial azimuth value therefrom. However, it will be understood that the initial azimuth value is not fully corrected, due for example to changes in the environment surrounding the antenna array that may occur after the initial calibration. Also, the magnetometers may be differently affected by stray magnetic fields, due to the spacings between the magnetometers within the alignment module. As such, in some embodiments the magnetometers may be arranged in an antipode arrangement and/or recalibrated, as discussed in detail below.

Still referring to FIG. 6, at block 640, respective expected phase difference values between the satellite signals received from respective navigation satellites are calculated, based on several factors. For example, the expected phase difference value for a respective navigation satellite may be calculated based on a known distance between two antennas in the alignment module or base station antenna array housing, coordinates of the respective navigation satellites (as calculated at block 625), a pitch angle of the alignment module (for example, as indicated by output from one or more accelerometers of the alignment module), and/or the initial azimuth value(s) output from the magnetometer(s) of the alignment module. As similarly noted above, the pitch angle of the base station antenna array may differ from the pitch angle of the alignment module, depending on the orientation of the alignment module in or on the base station antenna array housing. For example, when the alignment module is mounted so that the line between the two satellite antennas is perpendicular to the aiming direction of the base station antennas (as may typically be the case), pitch for the alignment module may correspond to the roll for the base station antenna array, and vice versa. The pitch angle of the alignment module (as indicated by the accelerometer(s) of the alignment module) may thus be correlated to provide further information as to the orientation of the antenna array relative to the coordinates of the respective navigation satellites, further increasing accuracy in calculation of the respective phase differences values.

Respective phase differences between the satellite signals received from respective navigation satellites at the antennas of the alignment module are also detected at block 650. In some embodiments, the detected phase differences at block 650 may be corrected to account for the phase of a local oscillator in the satellite receiver (such as the GPS receiver 314 of FIG. 3), for example, using double-differencing processing. Also, the phase differences may be detected at block 650 relative to a reference satellite, selected from among the navigation satellites. In some embodiments, the alignment module may be configured to select one of the navigation satellites having the highest elevation as the reference satellite. In other embodiments, one of the satellites having the largest signal-to-noise ratio may be selected as the reference satellite.

One or more of the phase differences may include a respective integer ambiguity, as a detected phase difference may not exceed one cycle, even if the actual phase difference is more than one cycle (e.g., a detected phase difference of 0.5 cycles may be indicative of an actual phase difference of 1.5 cycles, 2.5 cycles, etc.). For the respective navigation satellites, the expected/calculated phase difference values are compared with the detected phase differences to determine variations therebetween at block 660. The operations of blocks 625 to 660 may be based on satellite signals acquired over a duration of a few seconds (for example, 10 seconds or less) to reduce or avoid the possibility of inaccurate measurements yielding incorrect integer ambiguities.

At block 670, respective values are assigned to respective integer ambiguities in the detected phase differences, to reduce or minimize the variations with the corresponding calculated phase difference values. For example, when the calculated phase difference value for a particular satellite exceeds a detected phase difference for that same satellite by about one cycle or more, the detected phase difference may be offset by an integer value to reduce the variation relative to the corresponding calculated phase difference. As noted above, the calculated phase difference values (at block 640) are based on (and thus, limited by the accuracy of) the initial azimuth value(s) output from the magnetometer(s) (at block 630). Having resolved the respective integer ambiguities, the actual azimuth angle of the base station antenna array is then computed based on the respective detected phase differences for the respective navigation satellites at block 680.

Figure 7:
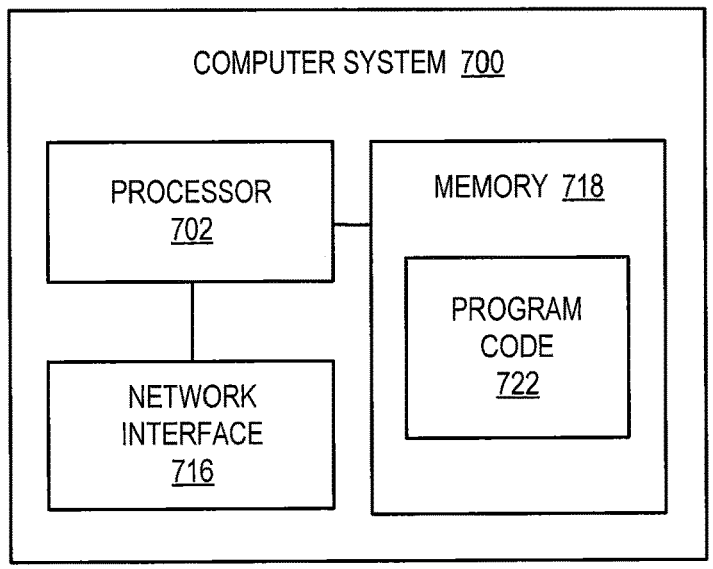
FIG. 7 is a block diagram illustrating a processor or computing device that may be implemented in the alignment module of FIG. 1, in accordance with some embodiments described herein.

The operations illustrated in the flowcharts of FIGS. 4-6 may be implemented by hardware operations and/or computer program instructions, which may be stored as computer readable program code in a computer readable memory. FIG. 7 is a block diagram of a computer system 700 that may be used as hardware to perform the operations of one or more of the embodiments disclosed herein for one or more of those elements. The computer system 700 can include one or more network interface circuits 716, one or more processor circuits 702 (referred to as "a processor" for brevity), and one or more memory circuits 718 (referred to as "a memory" for brevity) containing computer-readable program code 722.

The processor 702 may include one or more data processing circuits, such as a general purpose and/or special purpose processor (e.g., microprocessor and/or digital signal processor) that may be collocated or distributed across one or more networks. The processor 702 is configured to execute program code 722 in the memory 718, described herein as a computer readable storage medium, to perform some or all of the operations for one or more of the embodiments disclosed herein.

In some embodiments, the network interface 716 provides communication capability with other computer systems on a same local network, on a different network connected via modems and the like to the present network, or to other computers across the Internet. Additionally or alternatively, the network interface 716 may include one or more radio transceivers configured to communicate with wireless devices using one or more radio access technologies. The network interface 716 may be compliant with AISG standards in some embodiments.

The computer system 700 described herein may thus be provisioned with or may be otherwise configured to determine an azimuth or other orientation component of an apparatus based on data provided by one or more sensors of the apparatus in combination with detected phase differences in signals received at antennas of the apparatus, and may be configured to communicate the determined orientation to an external device or party in accordance with one or more standards, as described herein.

Figure 8C:
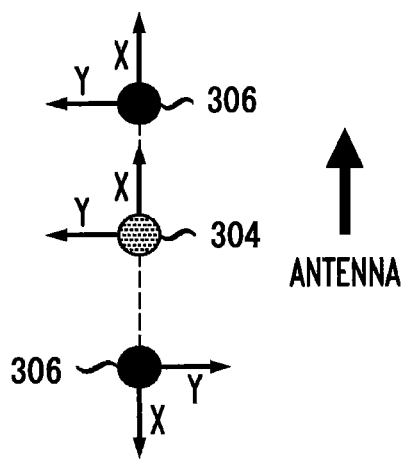
Figure 8C:
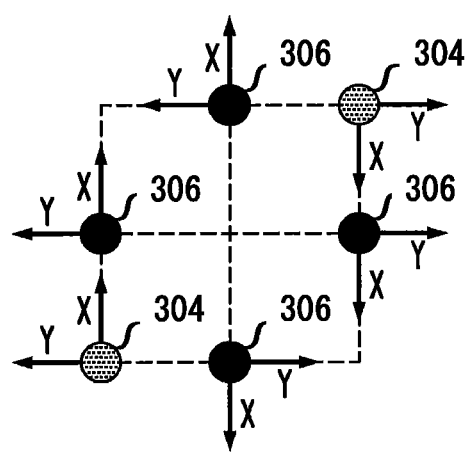
Figure 8C:
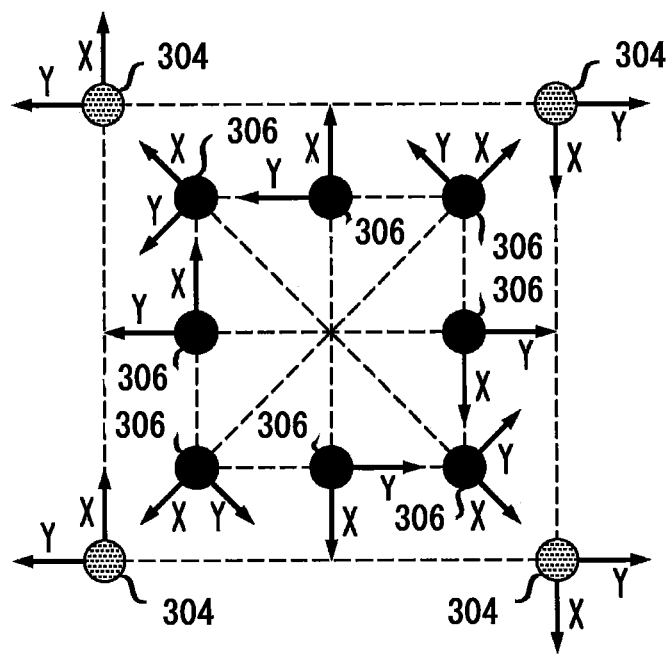

FIGS. 8A-8C illustrate relative locations and orientations of sensors (illustrated as accelerometers 304 and magnetometers 306) for three example alignment modules in accordance with embodiments of the present disclosure. In FIGS. 8A-8C, pairs of sensors are designated by dashed lines extending therebetween.

In particular, FIG. 8A shows a configuration having one accelerometer 304 and one opposing pair of magnetometers 306. The magnetometers 306 are arranged as antipodes. As used herein, two sensors are arranged as antipodes (or one sensor is said to be an antipode sensor with respect to the other sensor) when their X axes point in opposite directions, their Y axes point in opposite directions, and their Z axes point in the same direction. FIG. 8B shows a configuration having two accelerometers 304 arranged as antipodes and two opposing pairs of magnetometers 306, each pair arranged as antipodes. FIG. 8C shows a configuration having two opposing pairs of accelerometers 304, each arranged as antipodes, and four opposing pairs of magnetometers 306, each pair arranged as antipodes. Arrangements including pairs of sensors as antipodes can simplify equalization of measurements that may help mitigate the effects of localized perturbations.

An alignment module, such as the alignment module 102 of FIG. 1, may be rigidly mounted onto a base station antenna, such as antenna housing 100, with the X axis of each accelerometer 304 pointing either directly towards (e.g., parallel) or directly away from (e.g., anti-parallel) the antenna's main (horizontal or azimuth) pointing direction. For a vertically mounted antenna, the Z axis of each accelerometer 304 may point towards the Earth's gravitational center, and the Y axis of each accelerometer 304 may complete the right-hand rule, such that both the X and Y axes are in the local horizontal plane. Similarly, the X axis of each magnetometer 306 points either towards or away from the antenna's main pointing direction or, in the example configuration shown in FIG. 8C, at a 45-degree or 135-degree angle (within the horizontal plane) from the antenna's azimuth pointing direction, with the Z axis of each magnetometer pointing towards the center of Earth such that both the magnetometer's X and Y axes are also in the horizontal plane. Although largely illustrated with reference to even numbers of sensors in FIGS. 8A-8C by way of example, some embodiments of the present disclosure may include odd numbers of sensors, and/or fewer or more sensors than those illustrated. Magnetometer and accelerometer arrangements and use in orientation determination are further described in commonly-assigned U.S. patent application Ser. No. 14/418,171, entitled "Alignment Determination for Antennas and Such," the disclosure of which is incorporated by reference herein in its entirety.

Figure 9:
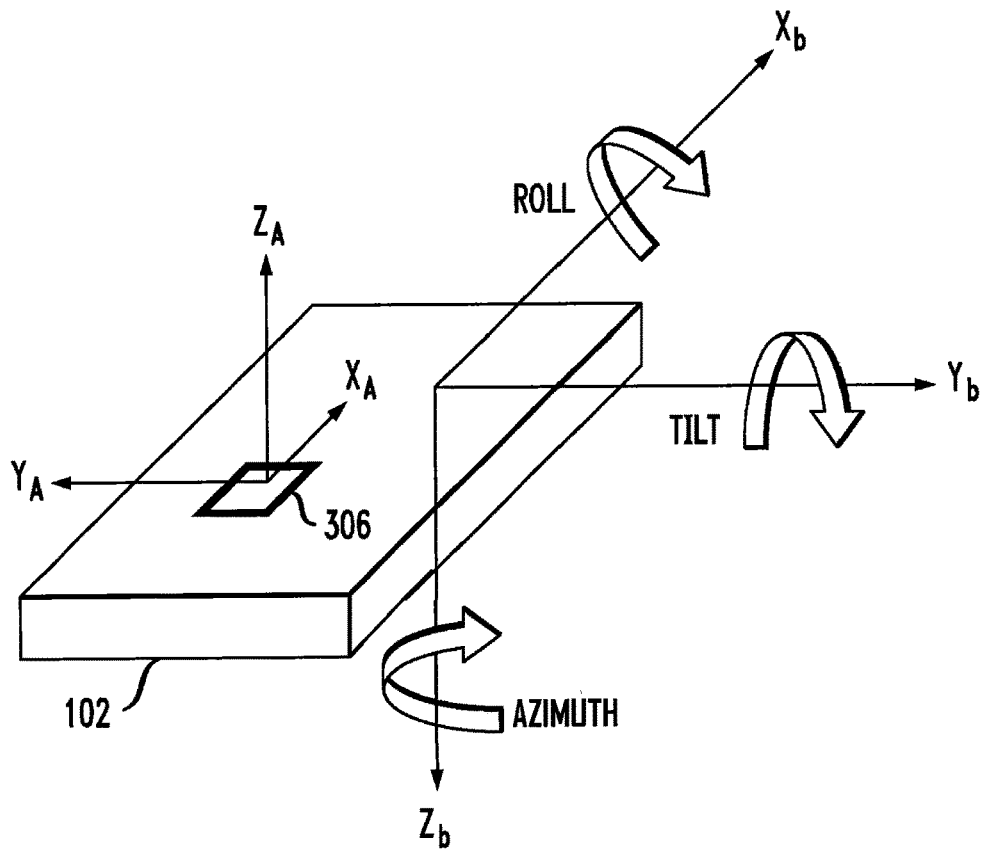
FIG. 9 illustrates Euler tilt, roll, and yaw rotations determined using the apparatus of FIGS. 3 and 8 and/or the methods of FIGS. 4-6 in accordance with some embodiments described herein.

FIG. 9 defines Euler tilt and roll rotations determined using one of the accelerometers 304 of FIGS. 3 and 8A-8C. In FIG. 9, the accelerometer 304 is part of an alignment module, such as module 102 of FIG. 1, that is rigidly mounted onto a base station antenna, such as antenna 100 of FIG. 1, in a forward-right-down configuration in which the X-axis (labeled $X_b$) points in the direction of the antenna's main (horizontal) pointing direction, the Z-axis (labeled $Z_b$) points towards the Earth's center, and the Y-axis labeled ($Y_b$) completes the right-hand rule, such that the $X_b$ and $Y_b$ axes lie in the local horizontal plane (i.e., perpendicular to Earth's gravity).

As represented in FIG. 9, a yaw rotation of the alignment module 102 is a rotation about the $Z_b$ axis (when roll and tilt rotations are both zero), where the yaw or azimuth angle is defined as the angle between the $X_b$ axis and a vertical plane that includes the $Z_b$ axis. Likewise, a tilt rotation of the alignment module 102 is a rotation about the $Y_b$ axis (when roll and yaw rotations are both zero), where the tilt angle is defined as the angle between the $X_b$ axis and a horizontal plane that includes the $Y_b$ axis. Similarly, a roll rotation of alignment module 102 is a rotation about the $X_b$ axis (when tilt and yaw rotations are both zero), where the roll angle is defined as the angle between the $Y_b$ axis and a horizontal plane that includes the $X_b$ axis.

As indicated in FIG. 9, accelerometer 304 generates three output signals $X_A$, $Y_A$, and $Z_A$, which represent the three-component magnitude of the Earth's gravitational field. When accelerometer 304 is oriented with its Z axis pointing directly away from the center of Earth, then the signals $X_A$ and $Y_A$ will both be zero. For a small, pure roll rotation, the magnitude of the Earth's gravitational field will be represented by non-zero $Y_A$ and $Z_A$ components with signal $X_A$ still zero. Similarly, for a small, pure tilt rotation, the magnitude of the Earth's gravitational field will be represented by non-zero $X_A$ and $Z_A$ components with signal $Y_A$ still zero. Note that, in FIG. 9, a positive value of sensor signal $X_A$ represents a positive roll rotation, but a positive value of sensor signal $Y_A$ represents a negative tilt rotation. Note further that sensor signal $Z_A$ has its maximum positive value when both roll and tilt rotations are zero.

Thus, for an initial configuration in which the antenna housing 100 of FIG. 1 is aligned with its Z axis pointing towards the Earth's center, and the alignment module 102 is rigidly mounted to antenna housing 100 with its X axis aligned with the antenna's main (horizontal) pointing direction and its Z axis also pointing towards the Earth's center, the $X_A$ and $Y_A$ signals generated by accelerometer 304 of FIG. 9 are both zero with all of the Earth's gravitational field represented by the maximum positive $Z_A$ signal. If, over time, the orientation of antenna 100 (and therefore the orientation of the rigidly mounted alignment module 102) changes, for example, corresponding to small roll and/or tilt rotations, then the accelerometer's $Y_A$ and/or $X_A$ signals will become non-zero (either positive or negative depending on the directions of the rotations), and the $Z_A$ signal will correspondingly decrease in magnitude. In general, a change in the orientation of antenna 100 may be represented by a sequence of non-zero Euler tilt, roll, and/or yaw rotations.

Accordingly, alignment modules 102 as described herein may include one or more accelerometers 304 and one or more magnetometers 306, whose various signals are processed to determine the current roll, tilt, and yaw (or azimuth) angles of the base station antenna array to, which the alignment module 102 is mounted. In particular, the tilt and roll angles may be determined using sensor signals from the one or more accelerometers, while the azimuth angle may be determined using (i) the determined tilt and/or roll angles, (ii) sensor signals from the one or more magnetometers, and (iii) expected vs. detected phase differences in satellite signals received via the satellite receiver.

Although described herein primarily with reference to an alignment module 102 mounted to a housing 100 of a base station antenna array, it will be understood that alignment modules in accordance with embodiments of the present disclosure may be mounted to structures or devices other than base station antennas for use in determining the tilt, roll, and yaw/azimuth angles of those other structures. Such other structures may be stationary or mobile (e.g., aircraft, boats, cars, etc.). When an alignment module has multiple accelerometers and/or multiple magnetometers, then multiple estimates of the tilt, roll, and/or yaw angles may be calculated.

In some example embodiments, the accelerometers may be oriented as North/East/Down (NED). In those embodiments, the roll/skew ($\phi$) and tilt/pitch ($\theta$) angles can be determined from the signals $X_A$, $Y_A$, and $Z_A$ generated by accelerometer 304 as follows:

$\phi = \arctan(Y_A/Z_A)$ $\theta = \arctan(-X_A/(Y_A \sin \phi + Z_A \cos \phi))$ Note that, for accelerometers that are aligned as antipodes to accelerometer 304 of FIG. 9 within the alignment module 102, the tilt and roll angles determined using these equations need to be multiplied by −1. Note further that these equations assume that a generic rotation of alignment module 102 can be represented by a particular sequence of Euler rotations consisting of a roll rotation followed by a tilt rotation. When the accelerometers have an orientation that differs from NED, the equations will be different.

Using multiple sensors, the alignment module 102 is configured to average the multiple results, which can mitigate the effect of measurement error and produces a more-accurate estimate. For an alignment module having two or more accelerometers 304, such as alignment module 102 of FIGS. 1-3, the tilt/pitch angle of the alignment module (and therefore the tilt/pitch angle of the antenna to which the alignment module is rigidly mounted) can be determined by averaging the tilt angles generated by the individual accelerometers 304, and similarly for the roll angle of the alignment module. Likewise, the initial azimuth angle of the alignment module (and therefore the initial azimuth angle of the structure to which the alignment module is rigidly mounted) can be determined by averaging the azimuth angles generated by the individual magnetometers 306.

The initial yaw/azimuth angle ($\psi$) of the alignment module 102 is defined as the angle by which the antenna array (or other device structure to which the alignment module 102 is mounted) is rotated about the $Z_b$ axis of FIG. 9, where the $Z_b$ axis points towards the Earth's center. When tilt and roll angles are zero, the azimuth angle is the angle in the local horizontal plane from the antenna's initial, main pointing direction. For a magnetometer 306 in a NED orientation (with its X axis initially pointing in the direction of the antenna's main pointing direction, its Z axis initially pointing to the center of Earth, and its Y axis completing the right-hand rule), if the tilt and roll angles of the antenna are negligible, then the initial azimuth angle $\psi$ of the magnetometer with respect to magnetic north can be calculated from the magnetometer's signals $X_H$, $Y_H$, and $Z_H$, which represent the magnitude of the Earth's magnetic field as measured by the magnetometer along respective X, Y, and Z axes), as follows:

$\psi = \arctan(-Y_H/X_H)$.

When the tilt and roll angles are not negligible, the calculation of the initial azimuth angle $\psi$ can compensate for the non-zero roll $\phi$ and tilt $\theta$ angles of the antenna as follows:

$\psi = \arctan Z_H(\sin\phi) - Y_H(\cos\phi)/(X_H(\cos\theta) + Y_H(\sin\theta)(\sin\phi) + Z_H(\sin\theta)(\cos\phi))$, where the roll $\phi$ and tilt $\theta$ angles are determined using one or more accelerometers, as described previously. This equation assumes an Euler-rotation sequence in which the yaw rotation occurs after the tilt and roll rotations; however, if each of the angles $\psi$, $\phi$, and $\theta$ is defined with the other two angles as zero, the sequence is unimportant.

As noted above, the accuracy of the initial azimuth value $\psi$ determined based on output of the magnetometers 306 may be dependent on two factors: (1) the magnetic declination and (2) the calibration of stray magnetic fields both within and in the vicinity of the magnetometers.

The magnetic declination is the angle, within the horizontal plane, between magnetic north (the direction in which the north end of a compass needle points, corresponding to the direction of the Earth's magnetic field lines) and true north (the direction along a meridian towards the geographic North Pole). The declination angle varies depending on one's position on the Earth's surface (i.e., geographic location), and/or over time. In some embodiments, the alignment module 102 may employ algorithms from the World Magnetic Model (WMM) to calculate the declination angle based on the coordinates provided by GPS receiver 314 of FIG. 3 (or may identify the declination angle based on determining the geographic location of the alignment module), and may correct the azimuth output from the magnetometer(s) 306 by adding or subtracting the declination angle thereto to determine the initial azimuth value from the output of the magnetometer(s) 306.

Stray magnetic fields that may be encountered by the magnetometers 306 may include those that exhibit a constant, additive field to the Earth's magnetic field (referred to herein as hard-iron effects) and those that influence, or distort, a magnetic field (referred to herein as soft-iron effects). For example, hard-iron effects may be due to the additional magnetic fields produced by neighboring materials that have a permanent magnetization, and soft-iron effects may be due to the distortion of the Earth's magnetic field by neighboring permeable materials such as iron. In some embodiments, the alignment module 102 may utilize a calibration procedure to correct the magnetometer readings for the soft- and hard-iron effects to determine the initial azimuth value from the output of the magnetometer(s) 306.

To calibrate for the soft-iron effects produced by the internal electronics on the printed circuit board (e.g., PCB 202), the PCB can be rotated 360 degrees in the horizontal plane (taking measurements every 30 degrees from all of the magnetometers). This procedure may be similarly repeated in the vertical plane. By averaging multiple measurements of a single axis from a single magnetometer obtained when rotating in a plane, a bias can be determined related to the effects the internal electronics have on those measurements. In a constant field, the above process would yield an average of zero. Biases can be calculated for each axis to produce a 3D offset vector for each magnetometer. The results of this factory calibration (i.e., a factory offset vector for each magnetometer) can be stored in a non-volatile memory (e.g., EPROM 318).

To reduce or mitigate the effect of soft-iron effects in the environment, the alignment module 102 may employ one or more pairs of magnetometers 306 oriented as antipodes. The alignment and orientation of each pair of magnetometers can allow the measurements from the antipode sensors to be used to maintain an "average difference" between the two sensors, which can be used to equalize the readings of both sensors (resulting in approximately equal and opposite measurements), to compensate for possible variations in the manufacturing of the sensors. Averaging of the measurements from sensors with the same orientation can further reduce the impact of local distortions to the magnetic field that may affect individual sensors differently. The above operations may be performed for each axis on each sensor to provide a three-dimensional offset ($V_x$, $V_y$, and $V_z$) vector (i.e., soft-iron offsets) for each sensor. Using this technique, the alignment module 102 may be configured to continually adjust for transient soft-iron effects during operation.

When hard-iron effects are present, the alignment module 102 may be configured to use the true azimuth angle to calibrate the magnetometers. When the true azimuth angle is known, the offsets can be found iteratively by finding the values of $X'_H$, $Y'_H$, and $Z'_H$ that result in the true azimuth. The difference between $X'_H$, $Y'_H$, and $Z'_H$ and the actual readings $X_H$, $Y_H$, and $Z_H$ produces one more three-dimensional offset vector (i.e., hard-iron offsets) for each sensor to be used in the initial azimuth angle calculation.

The offsets described herein (i.e., factory, soft-iron, and hard-iron), for each magnetometer 306 can be combined, via vector addition, into a single offset vector and subtracted from the measurements from that sensor. The sensor-based measurements may thus be calibrated for combined effects of the stray magnetic fields encountered by magnetometers, and/or the magnetic declination. As a result of the calibration process, the calculation of the initial azimuth angle $\psi$ based on the magnetometer output becomes:

$\psi = \arctan(Z_H - V_Z)(\sin\phi) - (Y_H - V_Y)(\cos\phi)/((X_H - V_X)(\cos\theta) + (Y_H - V_Y)(\sin\theta)(\sin\phi) + (Z_H - V_Z)(\sin\theta)(\cos\phi))$, Once calibrated, the magnetometers 306 may be configured to report the corrected initial azimuth angle even after the antenna's orientation changes (for example, within +/−15 degrees). By using multiple magnetometers 306, the alignment module 102 can average the yaw angles generated by the individual magnetometers (where each different magnetometer has its own unique set of offset values $V_x$, $V_y$, and $V_z$) in real time, which can reduce or mitigate the effects of measurement error and produce a more-accurate estimate.

Note that, if the magnetic environment changes during operation, then the magnetometer readings can become inaccurate, necessitating a re-calibration. Events that might change the magnetic environment include installation or removal of equipment in the vicinity of the magnetometer, a lightning strike which can magnetize ferrous materials in its path, etc. The alignment module 102 may further be configured to detect changes in the magnetic environment, as distinguished from detected variations caused by antenna rotation.

In particular, as the magnetic field of the Earth is generally not oriented in the local horizontal plane but at an angle to the horizontal that depends on the latitude of the observation point, only the horizontal component of the Earth's magnetic field may need to be monitored to derive an azimuth angle. The vertical component can be used to indicate changes in the magnetic environment, since it may be unlikely that stray magnetic fields would be oriented relative to the horizontal at exactly the same angle as the Earth's magnetic field. For example, stray magnetic fields that are spatially non-uniform over the distance between the magnetometers may cause the magnetic field at each magnetometer to have a different angle to the horizontal, whereas the angle of the Earth's field would be the same over the relatively short distances involved.

Another way to distinguish local magnetic environment changes from antenna rotations may be to compare signals from the one or more magnetometers with signals from the one or more accelerometers. An actual antenna rotation may be indicated by changes in both the magnetometer signals and accelerometer signals. If changes occur to only magnetometer signals, it can be inferred that those changes were due to magnetic environment changes.

Alignment modules 102 in accordance with embodiments of the present invention may utilize the operations discussed above in a variety of applications. In some embodiments, the alignment module 102 can create a three-dimensional (3D) pointer or other orientation indicator(s) with the pointing direction defined by the Euler angles: tilt, roll, and yaw. These angles can be monitored, for example, by the alignment module 102 and/or by a service provider or operator (based on information transmitted by the alignment module 102, for instance, via the AISG or other communication interface) to determine whether or not an orientation of a base station antenna array has changed from its initial or desired orientation. If a change in antenna orientation is detected, the service provider can decide to send a repair team to the base station to re-align the antenna.

In addition, the alignment module 102 may use the determination of the actual azimuth angle or other orientation of the antenna to adjust some of the signal processing and/or other operations to compensate for differences between the current orientation and the initial or desired orientation. For example, the alignment module 102 may control one or more mechanical elements to adjust an aiming direction or tilt of the housing 100 to a desired azimuth angle responsive to identifying the actual azimuth angle. In some embodiments, the alignment module 102 may electrically adjust the aiming direction or tilt by adjusting power levels and/or phase of a signal provided to radiating elements of the base station antenna array.

As such, in particular embodiments, alignment modules 102 described herein may be configured to provide one or more of the following features:

Data generated by the alignment module 102 may be transmitted to an external device on a request/polled basis.

Data generated by the alignment module 102 may be used to monitor targets and report alarms if thresholds of deviation beyond the targets are exceeded. For example, the actual azimuth angle (as determined or identified in accordance with embodiments of the present disclosure) may be compared to a threshold value responsive to identifying the actual azimuth angle, and an alarm may be provided responsive to the actual azimuth angle exceeding the threshold value.

Data generated by the alignment module may be transmitted over an AISG Compliant bus.

Data generated by the alignment module may be communicated to an AISG controller.

Data generated by the alignment module may be consumed by Self Organizing Network (SON) software and used to improve or optimize network performance.

The one or more magnetometers and one or more accelerometers may be included in the same hardware that is used to control electronic tilt, which may or may not share the same processor as the magnetometers and accelerometers.

Two or more GPS receivers may be used to determine the azimuth angle, and such measurements may be used to calibrate the one or more magnetometers.

Alignment modules 102 as described herein may thus enable one or more of the following capabilities:

The position of antenna housing 100 can be determined and monitored using GPS receiver 314.

The orientation of antenna housing 100 can be determined using the combination of one or more three-axis accelerometers 304 and one or more three-axis magnetometers 306.

Tilt and roll angles can be computed on the assumption that the accelerometer readings result entirely from the alignment module orientation in the Earth's gravitational field.

The accelerometer readings can provide tilt- and/or roll-angle information which can be used to correct the magnetometer output. This allows for more accurate determination of the initial azimuth angle, for example, when the alignment module is not oriented flat (i.e., at non-zero tilt and/or roll angles).

The magnetometer output can be corrected for declination angle, hard-iron effects, and soft-iron effects.

A 3D pointer can be implemented using the azimuth, tilt, and roll angles from the alignment module 102 and can be monitored to detect and determine changes.

Orientation determination in accordance with embodiments described herein may provide numerous advantages over some conventional methods. For example, as noted herein, while some conventional methods may use an iterative least squares method to resolve integer ambiguities in detected phase differences, such methods may be too time-consuming to be useful in many applications, such as alignment of radio antenna array units or modules. Moreover, the computer hardware included in such antenna array units may have limited processing power and thus, restricting the possible azimuth values to a range based on the output of a sensor (such as a magnetometer) and identifying the actual azimuth value among the possible values in the range may be more feasible from a processing perspective, allowing for less computation and thus less expense with respect to the processor requirements for the antenna array unit or module. Furthermore, the separation distance between antennas used in some conventional GPS-based azimuth determination methods may be too large to fit within the dimensions of the radome or other housing for radio base station antenna array units or modules in accordance with some embodiments described herein.

Embodiments of the present disclosure have been described above with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Reference herein to "some embodiments" or "an embodiment" means that a particular feature, structure, or characteristic described in connection with the embodiment(s) can be included in at least one embodiment of the invention. The phrase "in some embodiments" in the specification are not necessarily all referring to the same embodiment(s), nor are separate or alternative embodiments necessarily mutually exclusive of other embodiments. Aspects and elements of one or more embodiments of the present disclosure can be combined in any way and/or combination to provide a plurality of additional embodiments.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "on" another element, it can be directly on the other element or intervening elements may also be present. In contrast, when an element is referred to as being "directly on" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Unless otherwise defined, all technical and scientific terms used herein have the same meaning as commonly understood by one of ordinary skill in the art to which this invention belongs. The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Embodiments of the present disclosure have been described herein with reference to flowchart and/or block diagram illustrations of methods, systems, and devices in accordance with exemplary embodiments of the invention. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a tangible or non-transitory computer usable or computer-readable memory that may direct a computer or other programmable data processing apparatus to function in a particular manner, such that the instructions stored in the computer usable or computer-readable memory produce an article of manufacture including instructions that implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

It will be further appreciated that the functionality of any or all of the program modules may also be implemented using discrete hardware components, one or more application specific integrated circuits (ASICs), or a programmed digital signal processor or microcontroller. The program code may execute entirely on a single processor and/or across multiple processors, as a stand-alone software package or as part of another software package. The program code may execute entirely on an electronic device or only partly on the electronic device and partly on another device. In the latter scenario, the other device may be connected to the electronic device through a wired and/or wireless local area network (LAN) and/or wide area network (WAN), or the connection may be made to an external computer (for example, through the Internet using an Internet Service Provider).

In this specification including any claims, the term "each" may be used to refer to one or more specified characteristics of a plurality of previously recited elements or steps. When used with the open-ended term "comprising," the recitation of the term "each" does not exclude additional, unrecited elements or steps.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:
1. An apparatus, comprising:
  at least two antennas; and
  a controller coupled to the at least two antennas, wherein the controller is configured to perform operations comprising:
  detecting, for respective satellites, respective detected phase differences between satellite signals received therefrom at the at least two antennas;
  calculating, for the respective satellites, respective calculated phase difference values based on a distance between the at least two antennas in the apparatus, and positions of the respective satellites, wherein the respective calculated phase difference values are determined independent of the respective detected phase differences;
  identifying an actual azimuth angle of the apparatus based on variations between the respective detected phase differences and the respective calculated phase difference values for the respective satellites over a range of azimuth values; and
  adjusting an aiming direction or tilt of the apparatus to a desired azimuth angle or a desired pitch, respectively, responsive to identifying the actual azimuth angle.
2. The apparatus of claim 1, wherein identifying the actual azimuth angle comprises:

comparing, for the respective satellites, the respective detected phase differences with the respective calculated phase difference values to determine the variations therebetween; and identifying, within the range of azimuth values, the actual azimuth angle of the apparatus as corresponding to one of the variations between the respective detected phase differences and the respective calculated phase difference values for the respective satellites.

3. The apparatus of claim 2, wherein the one of the variations comprises a lowest variation between the respective detected phase differences and the respective calculated phase difference values for the respective satellites.

4. The apparatus of claim 1, wherein the respective detected phase differences comprise respective ambiguities, and wherein identifying the actual azimuth angle of the apparatus comprises:

assigning respective values to the respective ambiguities based on the range of azimuth values to reduce the variations between the respective detected phase differences and the respective calculated phase difference values for the respective satellites; and computing the actual azimuth angle of the apparatus based on the respective detected phase differences for the respective satellites, responsive to assigning the respective values to the ambiguities thereof.

5. The apparatus of claim 1, further comprising:
one or more sensors coupled to the controller,
wherein the operations further comprise:
determining an initial azimuth value for the apparatus based on output of the one or more sensors; and
determining the range of azimuth values about the initial azimuth value according to an accuracy of the one or more sensors.

6. The apparatus of claim 5, wherein the one or more sensors comprise one or more magnetometers, and further comprising:

one or more accelerometers coupled to the controller,
wherein calculating the respective calculated phase difference values is further based on the initial azimuth value from the output of the one or more magnetometers and a pitch angle of the apparatus indicated by output from the one or more accelerometers.

7. The apparatus of claim 5, wherein the one or more sensors comprise first and second magnetometers in an antipode arrangement within the apparatus.

8. The apparatus of claim 1, wherein detecting the respective detected phase differences is performed based on receiving the satellite signals from the respective satellites for a duration of about 10 seconds or less.

9. The apparatus of claim 1, wherein the positions of the respective satellites comprise coordinates calculated from the satellite signals received therefrom, and wherein the controller is further configured to perform operations comprising:

identifying the respective satellites responsive to analysis of the satellite signals received therefrom, wherein the identifying comprises determining a code phase and carrier frequency for the respective satellites;

tracking the code phase and carrier frequency for the respective satellites using phase-locked loops;

identifying respective preambles in the satellite signals responsive to the tracking, wherein the respective preambles indicate a beginning of each of multiple sub-frames in the satellite signals;

obtaining respective ephemeris parameters and time-of-week data for the respective satellites from ones of the multiple sub-frames in the satellite signals thereof; and calculating the coordinates of the respective satellites based on the respective ephemeris parameters and time-of-week data therefor.

10. The apparatus of claim 1, wherein the apparatus comprises an alignment module of a base station antenna array, wherein the positions of the respective satellites comprise coordinates of the satellites calculated from the satellite signals received therefrom and wherein the adjusting the aiming direction or tilt of the apparatus comprises:

adjusting an aiming direction or tilt of the base station antenna array to the desired azimuth angle or the desired pitch, respectively, responsive to identifying the actual azimuth angle.

11. The apparatus of claim 1, wherein the controller is further configured to perform operations comprising:

comparing the actual azimuth angle to a threshold value responsive to identifying the actual azimuth angle; and transmitting an alarm signal responsive to the actual azimuth angle exceeding the threshold value.

12. An apparatus, comprising:
at least two antennas; and
a controller coupled to the at least two antennas, wherein the controller is configured to perform operations comprising:

determining a range of azimuth values for the apparatus;

detecting, for respective satellites, respective detected phase differences between satellite signals received therefrom at the at least two antennas;

calculating, for the respective satellites, respective calculated phase difference values based on a distance between the at least two antennas in the apparatus, and positions of the respective satellites;

identifying an actual azimuth angle of the apparatus based on variations between the respective detected phase differences and the respective calculated phase difference values for the respective satellites over the range of azimuth values; and adjusting an aiming direction or tilt of the apparatus to a desired azimuth angle or a desired pitch, respectively, responsive to identifying the actual azimuth angle, wherein the apparatus comprises an alignment module of a base station antenna array, and wherein adjusting the aiming direction or tilt comprises adjusting power levels and/or phase of a signal provided to one or more radiating elements of the base station antenna array.

13. The apparatus of claim 12, wherein the apparatus further comprises a communication interface coupled to the controller, and wherein the controller is further configured to perform operations comprising:

monitoring changes in the aiming direction of the base station antenna array responsive to identifying the actual azimuth angle; and transmitting, via the communication interface, alignment and position of the base station antenna array to a base station operator.

14. A method for operating an apparatus, the method comprising performing operations as follows by at least one processor:

detecting, for respective satellites, respective detected phase differences between satellite signals received therefrom at two or more antennas in the apparatus;

calculating, for the respective satellites, respective calculated phase difference values based on a distance between the two or more antennas in the apparatus, and positions of the respective satellites, wherein the respective calculated phase difference values are determined independent of the respective detected phase differences;

identifying an actual azimuth angle of the apparatus based on variations between the respective detected phase differences and the respective calculated phase difference values for the respective satellites over a range of azimuth values; and adjusting an aiming direction or tilt of the apparatus to a desired azimuth angle or a desired pitch, respectively, responsive to identifying the actual azimuth angle.

15. The method of claim 14, wherein identifying the actual azimuth angle comprises:

comparing, for the respective satellites, the respective detected phase differences with the respective calculated phase difference values to determine the variations therebetween; and identifying, within the range of azimuth values, the actual azimuth angle of the apparatus as corresponding to one of the variations between the respective detected phase differences and the respective calculated phase difference values for the respective satellites.

16. The method of claim 15, wherein the one of the variations comprises a lowest variation between the respective detected phase differences and the respective calculated phase difference values for the respective satellites.

17. The method of claim 14, wherein the respective detected phase differences comprise respective ambiguities, and wherein identifying the actual azimuth angle of the apparatus comprises:

assigning respective values to the respective ambiguities based on the range of azimuth values to reduce the variations between the respective detected phase differences and the respective calculated phase difference values for the respective satellites; and computing the actual azimuth angle of the apparatus based on the respective detected phase differences for the respective satellites, responsive to assigning the respective values to the ambiguities thereof.

18. The method of claim 14, wherein the operations further comprise:

determining an initial azimuth value for the apparatus based on output of one or more sensors; and determining the range of azimuth values about the initial azimuth value according to an accuracy of the one or more sensors.

19. The method of claim 18, wherein the one or more sensors comprise one or more magnetometers, and wherein calculating the respective calculated phase difference values is further based on the initial azimuth value from the output of the one or more magnetometers and a pitch angle of the apparatus indicated by output from one or more accelerometers.

20. The method of claim 14, wherein detecting the respective detected phase differences is performed based on receiving the satellite signals from the respective satellites for a duration of about 10 seconds or less.

21. The method of claim 14, wherein the positions of the respective satellites comprise coordinates calculated from the satellite signals received therefrom, and further comprising:

identifying the respective satellites responsive to analysis of the satellite signals received therefrom, wherein the identifying comprises determining a code phase and carrier frequency for the respective satellites;

tracking the code phase and carrier frequency for the respective satellites using phase-locked loops;

identifying respective preambles in the satellite signals responsive to the tracking, wherein the respective preambles indicate a beginning of each of multiple sub-frames in the satellite signals;

obtaining respective ephemeris parameters and time-of-week data for the respective satellites from ones of the multiple sub-frames in the satellite signals thereof; and calculating the coordinates of the respective satellites based on the respective ephemeris parameters and time-of-week data therefor.

22. A computer program product for operating an apparatus, the computer program product comprising:

a non-transitory computer readable storage medium having computer readable program code embodied in the medium that, when executed by a processor, causes the processor to perform operations comprising:

detecting, for respective satellites, respective detected phase differences between satellite signals received therefrom at two or more antennas in the apparatus;

calculating, for the respective satellites, respective calculated phase difference values based on a distance between the two or more antennas in the apparatus, and positions of the respective satellites, wherein the respective calculated phase difference values are determined independent of the respective detected phase differences;

identifying an actual azimuth angle of the apparatus based on variations between the respective detected phase differences and the respective calculated phase difference values for the respective satellites over a range of azimuth values; and adjusting an aiming direction or tilt of the apparatus to a desired azimuth angle or a desired pitch, respectively, responsive to identifying the actual azimuth angle.

* * * * *